United States Patent
Xiao et al.

(10) Patent No.: US 9,726,092 B2
(45) Date of Patent: Aug. 8, 2017

(54) METHODS AND SYSTEMS FOR BOOST CONTROL

(71) Applicant: Ford Global Technologies, LLC, Dearborn, MI (US)

(72) Inventors: Baitao Xiao, Canton, MI (US); Hamid-Reza Ossareh, Ann Arbor, MI (US); Julia Helen Buckland, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 14/942,487

(22) Filed: Nov. 16, 2015

(65) Prior Publication Data

US 2017/0138278 A1    May 18, 2017

(51) Int. Cl.
*F02B 33/00*    (2006.01)
*F02D 41/00*    (2006.01)

(52) U.S. Cl.
CPC ................... *F02D 41/005* (2013.01)

(58) Field of Classification Search
CPC .... F02D 41/005; F02D 41/0007; F02B 37/16; F02B 37/164; F02B 37/166; F02B 37/168; F02B 37/18; F02B 37/183; F02B 2037/162
USPC ..... 123/436, 559.1, 562, 564; 701/103, 110; 60/598, 600, 602, 612
See application file for complete search history.

(56) References Cited

U.S. PATENT DOCUMENTS

| | | | |
|---|---|---|---|
| 4,618,310 A | 10/1986 | Michelson | |
| 5,771,868 A * | 6/1998 | Khair | F02B 33/32 123/568.12 |
| 6,920,756 B2 * | 7/2005 | Hoecker | F02B 37/04 123/562 |
| 7,451,597 B2 * | 11/2008 | Kojima | F02B 29/0418 60/605.1 |
| 8,490,395 B2 * | 7/2013 | Grissom | F02B 37/013 123/562 |
| 8,635,869 B2 * | 1/2014 | An | F02B 37/007 60/600 |
| 8,939,704 B2 | 1/2015 | Winkes | |
| 9,010,114 B2 * | 4/2015 | Krug | F02B 29/0412 60/605.1 |
| 9,091,202 B2 | 7/2015 | Styles et al. | |
| 9,174,637 B2 | 11/2015 | Banker et al. | |
| 9,238,998 B2 | 1/2016 | Doering et al. | |

(Continued)

OTHER PUBLICATIONS

Xiao, Baitao et al., "Methods and Systems for Boost Control ," U.S. Appl. No. 14/799,289, filed Jul. 14, 2015, 34 pages.

(Continued)

*Primary Examiner* — Hai Huynh
(74) *Attorney, Agent, or Firm* — Julia Voutyras; McCoy Russell LLP

(57) ABSTRACT

Methods and systems are provided for surge control in an engine system having multiple staged charge boosting devices. In one example, responsive to a drop in driver torque demand, compressed air is continued to be provided by operating a downstream intake compressor while accelerating an upstream compressor to reduce flow through the first compressor. By increasing the compressor pressure ratio at the first compressor via operation of the second compressor, surge is reduced without degrading boosted engine performance.

20 Claims, 5 Drawing Sheets

(56) References Cited

U.S. PATENT DOCUMENTS

| | | | | |
|---|---|---|---|---|
| 9,359,975 B2* | 6/2016 | Tanaka | ............... | F02B 39/10 |
| 2004/0194466 A1* | 10/2004 | Kawamura | ............ | F02B 33/34 |
| | | | | 60/612 |
| 2008/0216795 A1* | 9/2008 | Dietz | ............... | F02B 37/001 |
| | | | | 123/344 |
| 2009/0007563 A1* | 1/2009 | Cooper | ............... | F02B 33/32 |
| | | | | 60/600 |
| 2013/0209291 A1* | 8/2013 | Kitsukawa | ............ | F02B 37/013 |
| | | | | 417/410.1 |
| 2015/0047346 A1 | 2/2015 | Styles et al. | | |
| 2016/0312687 A1* | 10/2016 | Kemmerling | ......... | F02B 37/002 |

OTHER PUBLICATIONS

Xiao, Baitao et al., "Methods and Systems for Boost Control," U.S. Appl. No. 14/799,342, filed Jul. 14, 2015, 35 pages.

Banker, Adam Nathan et al., "Method and System to Reduce Charge Air Cooler Condensation," U.S. Appl. No. 14/829,968, filed Aug. 19, 2015, 29 pages.

Ossarefi, Hamid-Reza et al., "Method and System for Engine Speed Control," U.S. Appl. No. 14/927,070, filed Oct. 29, 2015, 33 pages.

* cited by examiner

METHODS AND SYSTEMS FOR BOOST CONTROL

FIELD

The present description relates generally to methods and systems for controlling engine boosting devices to reduce surge issues.

BACKGROUND/SUMMARY

Engine systems may be configured with boosting devices, such as turbochargers or superchargers, for providing a boosted aircharge and improving peak power outputs. The use of a compressor allows a smaller displacement engine to provide as much power as a larger displacement engine, but with additional fuel economy benefits. However, compressors are prone to surge. For example, when an operator tips-out of an accelerator pedal, an engine intake throttle closes, leading to reduced forward flow through the compressor, degrading turbocharger performance and possibly leading to compressor surge. Compressor surge can lead to NVH issues such as undesirable noise from the engine intake system.

One example attempt to address compressor surge is shown by Styles et al. in US 20150047346. Therein, when the engine operates at or beyond a compressor surge line, a continuously variable compressor recirculation valve (CCRV) is opened to recirculate a portion of cooled boosted air from downstream of a charge air cooler to the compressor inlet. The approach improves the compressor pressure ratio, mitigating surge.

The inventors herein have identified an approach that may augment the CCRV and/or reduce the need for a CCRV in systems with compound boosting, leading to potential for improved performance and/or cost reduction. The method includes: bypassing a second compressor and providing a flow of compressed air to a piston engine via a first compressor in normal operating conditions; and in response to a decrease in demanded engine torque, accelerating the second compressor and reducing the flow of compressed air to the engine. In this way, a second compressor staged upstream of a first compressor can be used to mitigate surge.

As one example, a boosted engine system may include an electric supercharger coupled upstream of a turbocharger. During conditions when boost is required and while the turbine of the turbocharger is spinning up, the electric supercharger may be used to provide compressed air to the engine. Then, once the turbine spins up, the turbocharger compressor may be used to provide compressed air to the engine, while bypassing the supercharger. In response to throttle reduction, for example in response to an operator pedal tip-out, to reduce the likelihood of surge at the turbocharger compressor, the electric supercharger may be spun up while the turbocharger continues to spin (due to high inertia). This results in an increase in pressure at the turbocharger compressor inlet, moving the compressor ratio of the turbocharger further from a surge threshold. Once the turbocharger flow has been sufficiently reduced, the supercharger may be disabled, and compressed air may once again be provided via the turbocharger, when needed.

Compressor surge boundary is defined in terms of compressor flow and pressure ratio. CCRV initial impact is in the flow domain, while the approach defined herein has initial effect in the pressure ratio domain. Combining the two approaches extends the surge free operating regime, improving system performance, and/or reduces the size of the CCRV, which lowers system cost. In some cases, the CCRV may be eliminated and the approach described herein may be combined with a conventional on/off CRV, which also reduces system cost.

The technical effect of increasing the compressor pressure ratio at the first, downstream compressor via operation of the second, upstream compressor is that surge can be reduced without degrading boosted engine performance. By operating the supercharger to increase pressure upstream of the first compressor's inlet, and decrease flow through the first compressor, the need for operating a compressor recirculation valve to mitigate surge is reduced. As such, this improves the performance of a boosted engine system having staged charging devices.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
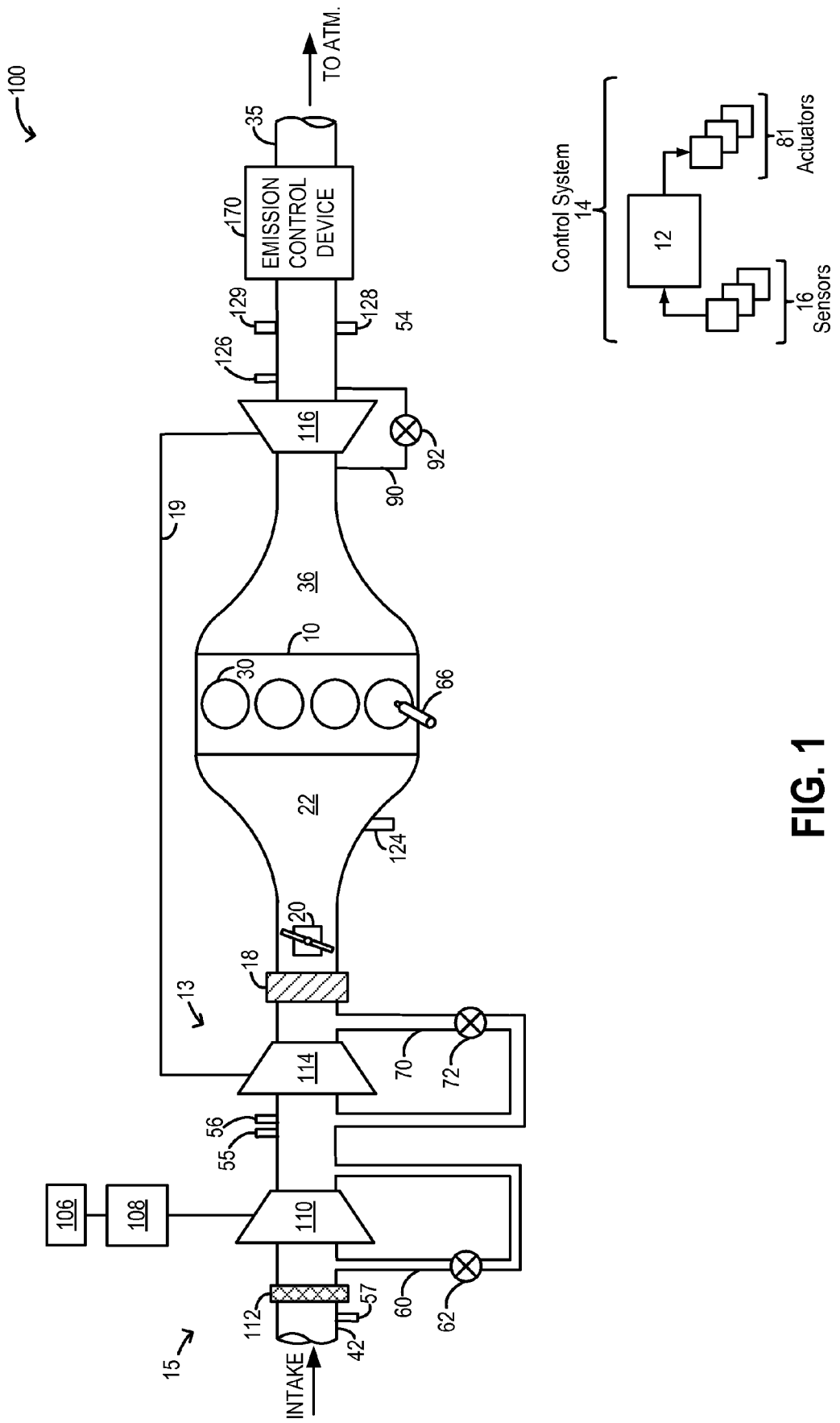
FIG. 1 shows an example embodiment of a boosted engine system having multiple staged charge boosting devices.

The following description relates to systems and methods for improving surge margins in an engine system having staged boosting devices, such as in the boosted engine system of FIG. 1. A controller may be configured to perform a routine, such as the example routines of FIGS. 2-3, to increase the speed of an upstream compressor to improve the surge margin of a downstream compressor. By operating the second compressor, a pressure ratio across the first compressor can be reduced (FIG. 4). An example surge mitigating operation is shown with reference to FIG. 5. In this way, surge occurrence during boosted engine operation can be reduced.

FIG. 1 schematically shows aspects of an example engine system 100 including an engine 10. In the depicted embodiment, engine 10 is a boosted engine including multiple, staged boosting devices. Specifically, engine 10 includes a first boosting device 13 staged downstream of a second boosting device 15. The configuration results in a first compressor 114 (of the first boosting device) being positioned in the engine intake passage 42 downstream of a second compressor 110. In the present example, the first boosting device is a turbocharger 13, while the second boosting device is an electric supercharger 15.

Electric supercharger 15 includes second compressor 110 driven by electric motor 108. Motor 108 is powered by an on-board energy storage device, such as system battery 106. Fresh air is introduced along intake passage 42 into engine 10 via air cleaner 112 and flows to second compressor 110. Air compressed by second compressor 110 is then delivered to first compressor 114. During selected conditions, as elaborated below, air may bypass supercharger 15 and be directed to turbocharger 13 through second compressor bypass 60 by adjusting the opening of a bypass valve 62.

Turbocharger 13 includes first compressor 114 driven by a turbine 116. First compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), where turbine geometry is actively varied as a function of engine operating conditions. Fresh air received at the compressor inlet of first compressor 114 is introduced into engine 10. During selected conditions, as elaborated below, air compressed by turbocharger 13 may be recirculated from the outlet to the inlet of compressor 114 through first compressor bypass 70 by adjusting the opening of a compressor recirculation valve (CRV) 72. CRV 72 may be a continuously variable valve and increasing the opening of the recirculation valve may include actuating (or energizing) a solenoid of the valve.

As shown in FIG. 1, first compressor 114 is coupled, through charge-air cooler (CAC) 18 (herein also referred to as an intercooler) to throttle valve 20. Throttle valve 20 is coupled to engine intake manifold 22. From the first compressor, the compressed air charge flows through the charge-air cooler 18 and the throttle valve to the intake manifold. The charge-air cooler may be an air-to-air or water-to-air heat exchanger, for example. In the embodiment shown in FIG. 1, the pressure of the air charge within the intake manifold is sensed by manifold air pressure (MAP) sensor 124.

It will be appreciated that, as used herein, first compressor refers to the downstream of the staged compressors and second compressor refers to the upstream of the staged compressors. In one non-limiting example, as depicted, the first downstream compressor is a turbocharger compressor while the second upstream compressor is a supercharger compressor. However, other combinations and configurations of boosting devices may be possible.

During selected conditions, such as during a tip-in, when going from engine operation without boost to engine operation with boost, turbo lag can occur. This is due to delays in turbine spin-up of the first compressor 114. To reduce this turbo lag, during those selected conditions, both supercharger 15 and turbocharger 13 may be enabled. Specifically, while turbine 116 spins-up, boost pressure can be provided by the upstream supercharger compressor 110. Enabling the supercharger includes drawing energy from battery 106 to spin motor 108, to thereby accelerate second compressor 110. In addition, bypass valve 62 may be closed so as to enable a larger portion of air to be compressed by second compressor 110. Then, when the turbine has sufficiently spun up, and is capable of driving first compressor 114, the second compressor may be decelerated by disabling motor 108. In addition, bypass valve 62 may be opened so as to enable a larger portion of air to bypass second compressor 110.

During selected conditions, such as during a tip-out, when going from engine operation with boost to engine operation without boost, or reduced boost, compressor surge can occur. This is due to a decreased flow through the first compressor when the throttle closes at the tip-out. The reduced forward flow through the first compressor can cause surge and degrade turbocharger performance. In addition, surge can lead to NVH issues such as undesirable noise from the engine intake system. To mitigate compressor surge, at least a portion of the aircharge compressed by first compressor 114 may be recirculated to the compressor inlet. This allows flow through the first compressor 114 to remain relatively high and excess boost pressure to be substantially immediately relieved, both of which reduce tendency for compressor surge. The compressor recirculation system may include a recirculation passage 70 for recirculating (warm) compressed air from the compressor outlet of first compressor 114, upstream of charge-air cooler 18 to the compressor inlet of first compressor 114. In some embodiments, the compressor recirculation system may alternatively, or additionally, include a recirculation passage for recirculating (cooled) compressed air from the compressor outlet, downstream of the charge-air cooler to the compressor inlet.

One or both of valves 62 and 72 may be continuously variable valves wherein a position of the valve is continuously variable from a fully closed position to a fully open position. Alternatively, compressor recirculation valve 72 may be a continuously variable valve while compressor bypass valve 62 is an on-off valve. In some embodiments, CRV 72 may be normally partially open during boosted engine operation to provide some surge margin. Herein, the partially open position may be a default valve position. Then, in response to the indication of surge, the opening of CRV 72 may be increased. For example, the valve(s) may be shifted from the default, partially open position towards a fully open position. A degree of opening of the valve(s) during those conditions may be based on the indication of surge (e.g., the compressor ratio, the compressor flow rate, a pressure differential across the compressor, etc.). In alternate examples, CRV 72 may be held closed during boosted engine operation (e.g., peak performance conditions) to improve boost response and peak performance.

The inventors have recognized that by increasing the boost pressure upstream of the first compressor via operation of the second compressor responsive to a drop in torque demand, such as during a tip-out, compressor surge can also be reduced (e.g., avoided). As elaborated below, during a drop in torque demand, while the turbocharger is compressing air, the supercharger may be re-enabled. In addition, bypass valve 62 may be closed so that a flow of compressed air is provided to the engine via each of the first and second compressors. By compressing air at the upstream compressor before delivering it to the downstream compressor, a boost pressure at the inlet of the first compressor is increased, lowering the pressure ratio at the first compressor. This allows the operation of the first compressor to be moved further away from a surge boundary during the tip-out.

It will be appreciated, as elaborated below, that there may be selected torque reduction conditions where surge may be better relieved by opening CRV 72, while during other torque reduction conditions, surge may be better relieved by accelerating second compressor 110. As one example, when the state of charge of battery 106 is higher, second compressor may be accelerated, while CRV 72 may be opened when the state of charge of battery 106 is lower.

One or more sensors may be coupled to an inlet of first compressor 114 (as shown) and/or second compressor 110 (not shown). For example, a temperature sensor 55 may be coupled to the inlet for estimating a compressor inlet temperature. As another example, a pressure sensor 56 may be coupled to the inlet for estimating a pressure of aircharge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the aircharge recirculated from upstream of the CAC. One or more sensors may also be coupled to intake passage 42, upstream of compressor 114 and compressor 110, for determining a composition and condition of aircharge entering the compressor. These sensors may include, for example, manifold air flow sensor 57.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, by-passing the turbine. Wastegate actuator 92 may be actuated open to dump at least some exhaust pressure from upstream of the turbine to a location downstream of the turbine via wastegate 90. By reducing exhaust pressure upstream of the turbine, turbine speed can be reduced.

The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, some exhaust may be diverted instead to the intake passage via an EGR passage (not shown) including an EGR cooler and an EGR valve. EGR may be recirculated to the inlet of first compressor 114, second compressor 110, or both.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, and MAF sensor 57. Other sensors such as additional pressure, temperature, air/fuel ratio, and composition sensors may be coupled to various locations in engine system 100. The actuators 81 may include, for example, throttle 20, compressor recirculation valve 72, compressor bypass valve 62, electric motor 108, wastegate actuator 92, and fuel injector 66. The control system 14 may include a controller 12. The controller may receive input data from the various sensors, process the input data, and employ the various actuators based on the received signals and instructions stored on a memory of the controller. The controller may employ the actuators in response to the processed input data based on instruction or code programmed therein corresponding to one or more routines, such as example control routines described herein with regard to FIGS. 2-3.

Figure 2:
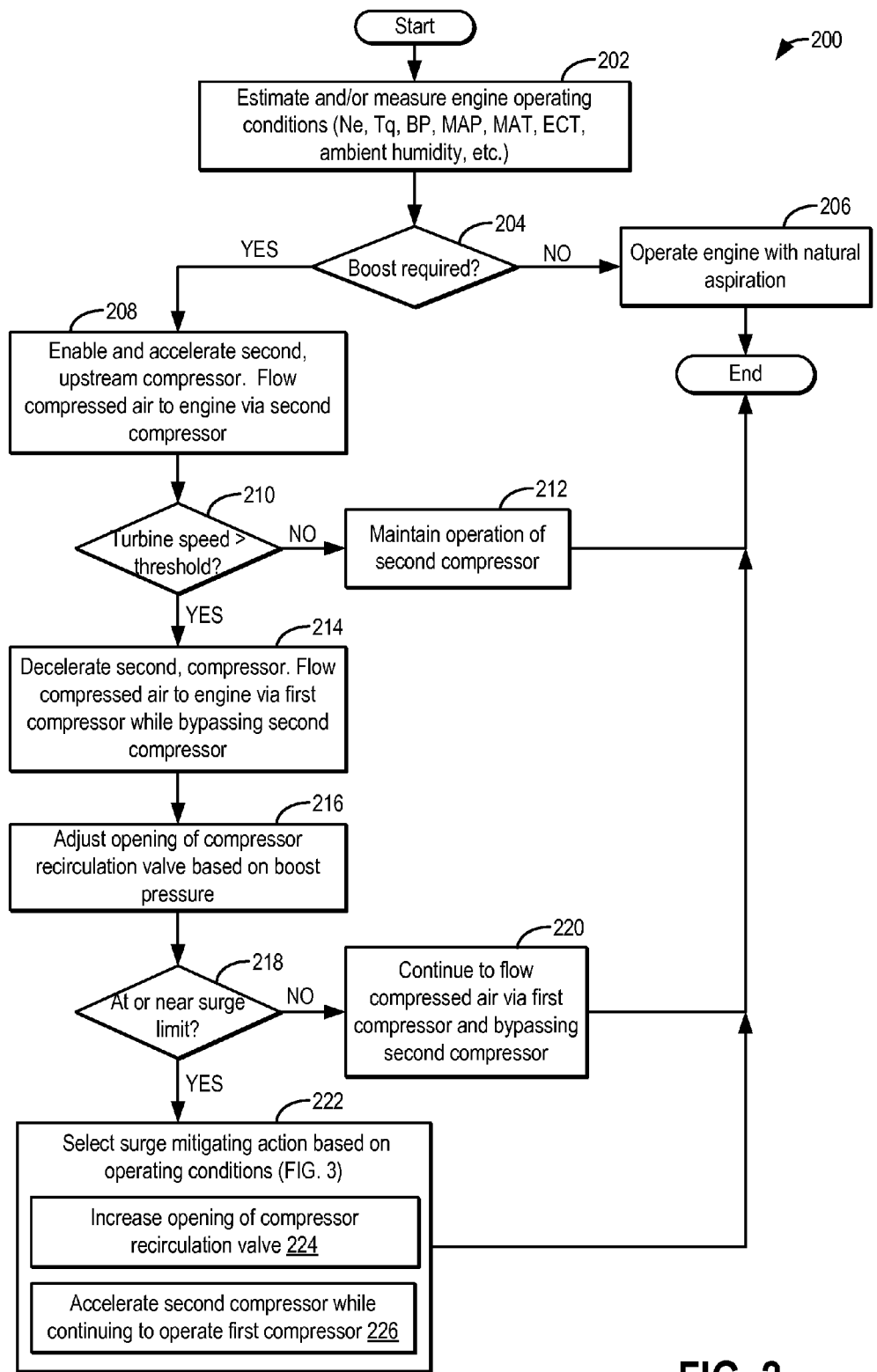
FIG. 2 shows a high level flow chart illustrating a routine that may be implemented for reducing compressor surge responsive to a decrease in driver demanded torque.

Turning now to FIG. 2, an example routine 200 is shown for operating a compressor of an upstream boosting device (e.g., supercharger) to reduce each of turbo lag and surge at the compressor of a downstream boosting device (e.g., turbocharger). Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating engine operating conditions, such as engine speed, pedal position, operator torque demand, ambient conditions (ambient temperature, pressure, humidity), engine temperature, etc. At 204, the method includes determining if boost is required. In one example, boost may be required at mid-high engine loads. In another example, boost may be required in response to an operator pedal tip-in or increase in driver torque demand. If boost is not required, such as when the engine load is low or the driver torque demand is low, the method moves to 206 wherein the engine is operated with natural aspiration.

If boost is required, then at 208, the method includes, enabling a second, upstream compressor while a turbine coupled to a first, downstream compressor spins up. Herein, in response to an increase in driver demanded torque, a second compressor is accelerated and the flow of compressed air to the engine is increased. Herein the second compressor is staged upstream of the first compressor along an air intake passage. Further, the second compressor is driven by an electric motor while the first compressor is driven by an exhaust turbine. In one example, as shown with reference to FIG. 1, the first compressor is a turbocharger compressor while the second compressor is a supercharger compressor. Herein, accelerating the second compressor includes spinning the second compressor via the electric motor using power drawn from a battery. The second compressor is accelerated based on the increase in boost demand. Thus, compressed air is provided to the engine via the second compressor.

As such, electric superchargers may have a response time (that is, idle to 100% duty cycle) of 130-200 ms and therefore may be able to deliver boost much faster compared to a typical turbocharger response time (1-2 second). Therefore, the second compressor of the electric supercharger may be able to fill the turbo lag significantly faster.

As exhaust heat and pressure develops due to cylinder combustion, the exhaust turbine speed increases, driving the first compressor. At 210, it is determined if the turbine speed is higher than a threshold, such as above a threshold where the turbocharger is able to sustain the boost demand. If not, operation of the second compressor (of the supercharger) is maintained.

If turbine speed is higher than the threshold, then at 212, the method includes decelerating the second compressor, by disabling the electric motor for example. Additionally, a bypass valve (such as bypass valve 62) may be opened allowing air to bypass second compressor and flow to the (downstream) first compressor. Thus, after the turbine has spun up sufficiently, the method includes bypassing the second compressor and providing a flow of compressed air to a piston engine via the first compressor. Herein, compressed air is not provided to the engine via the second compressor. In this way, by transiently operating the second compressor of the supercharger until the turbocharger turbine is spun up, turbo lag due to delays in spinning up the first compressor are reduced.

At 216, once the turbocharger compressor (the first compressor) is spinning and providing compressed air to the engine, the method includes adjusting an opening of the compressor recirculation valve based on boost pressure. For example, the compressor recirculation valve may be held partially open to provide some surge margin.

At 218, it may be determined if the first compressor is operating at or near the surge limit. In one example, the first compressor may move closer to the surge limit in response to a decrease in demanded engine torque. The decrease in demanded engine torque may be due to an operator pedal tip-out, for example. If the first compressor is not at or near the surge limit, then at 220, the method includes continuing to flow compressed air to the piston engine via the first compressor and while bypassing the second compressor.

If the first compressor is at or near the surge limit, then at 222, the method includes selecting a surge mitigation method based on operating conditions. For example, at 226, a surge margin may be improved by accelerating the second compressor and reducing the flow of compressed air to the engine (through the first compressor). As another example, at 224, the surge margin may be improved by increasing an opening of the compressor recirculation valve (e.g., fully opening the valve). When a reduction in engine torque is requested, for example during a gear shift or due to driver tipping out of pedal, an engine controller may select an appropriate surge mitigating action from the available options based on engine operating conditions, as elaborated at FIG. 3.

Figure 3:
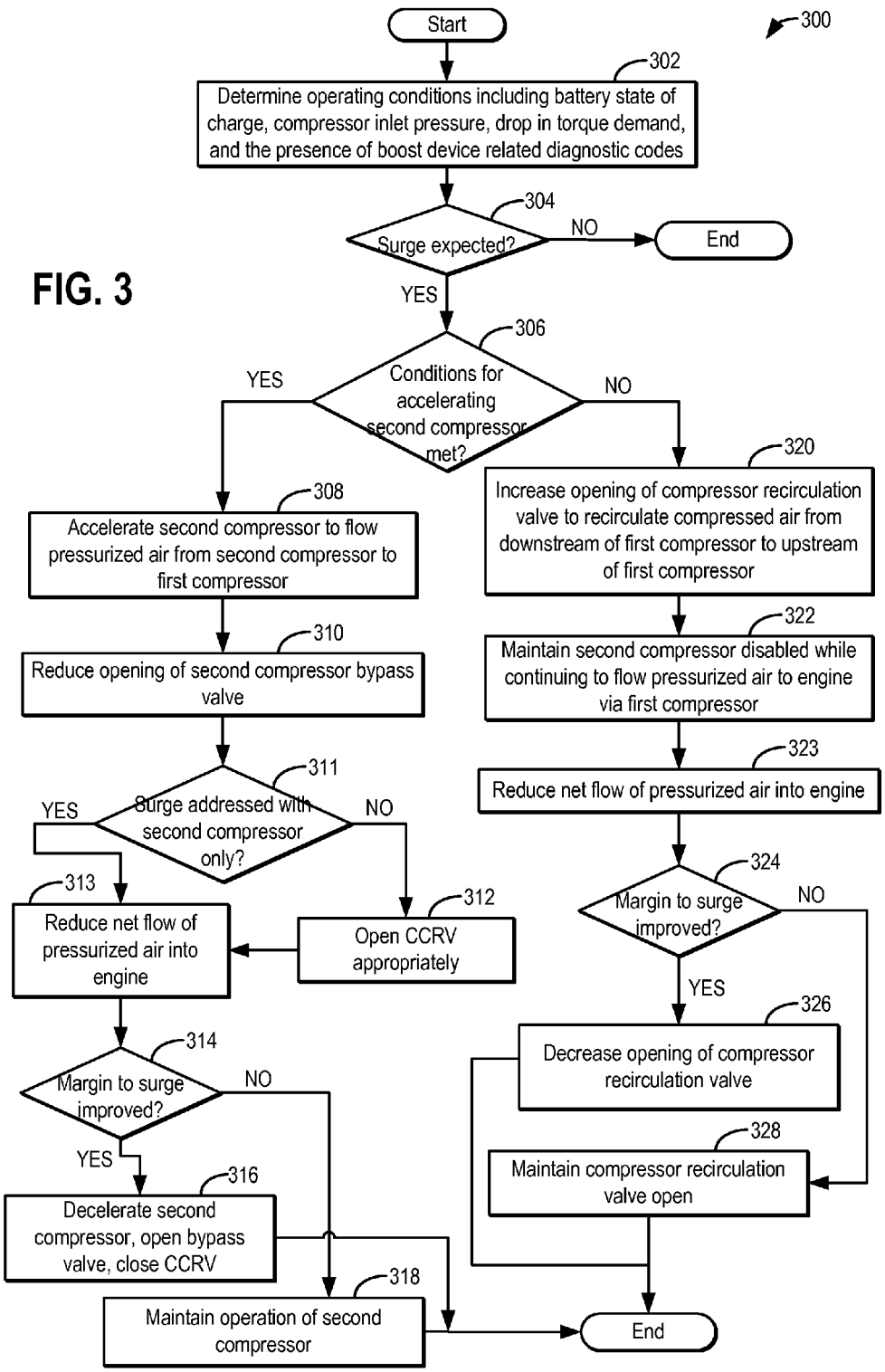
FIG. 3 shows a high level flow chart illustrating a routine that may be implemented for operating an upstream compressor to reduce surge at a downstream compressor.
Figure 4:
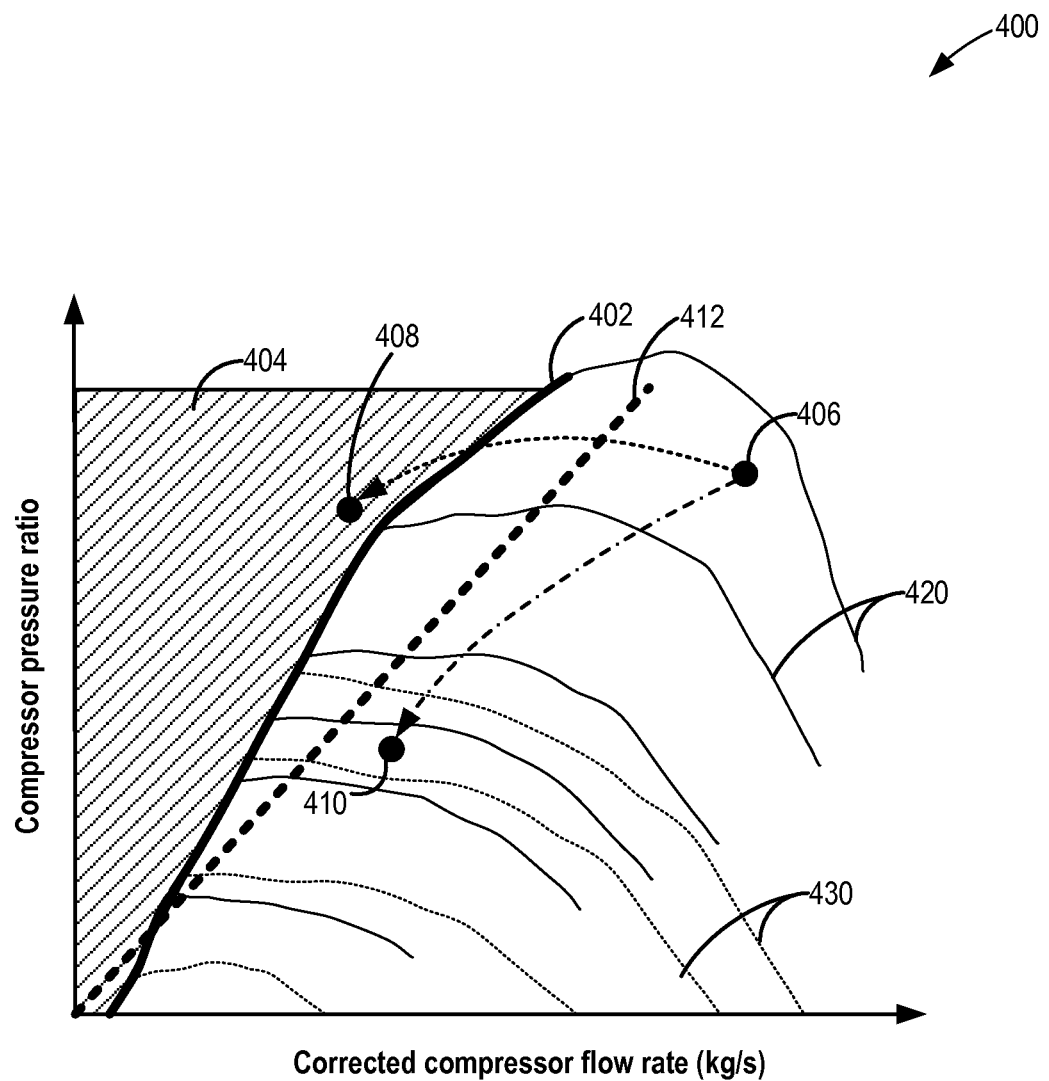
FIG. 4 shows a compressor map depicting a surge limit of a turbocharger compressor, and the effect of operating an electric supercharger in surge mitigation.

Now turning to FIG. 3, method 300 depicts selecting of a surge mitigating action based on operating conditions in response to a decrease in demanded torque.

At 302, various engine operating conditions are estimated and/or measured such as a state of charge of the battery coupled to the electric motor driving the second compressor, a compressor inlet pressure of at least the first compressor, a change (e.g., a drop) in torque demand, and the presence of any diagnostic codes (or MILs) related to the boost devices (such as related to the first or the second compressor).

At 304, the method includes confirming that surge is expected. For example, surge may be expected in response to a decrease in demanded engine torque. In one example, engine torque demand reduction may be responsive to an operator pedal tip-out from high boost pressure. In another example, engine torque demand reduction may be responsive to one or more of a transmission gear shift, a request for vehicle wheel traction control, and a demand for vehicle speed cruise control, etc. As another example, surge may be expected based on a compressor pressure ratio and a mass flow rate across the first compressor relative to a surge threshold, as may be determined using a compressor map. One example of such a map is shown at FIG. 4, and described therein. If surge is not expected at 304, the method ends and the routine exits.

At 306, it may be determined if conditions for accelerating the second compressor have been met. Conditions may be considered met if any one of the following conditions are confirmed: the state of charge of the battery coupled to the electric motor of the second compressor is higher than a threshold, the torque demand reduction prompting the surge likelihood is higher than a threshold (e.g., the tip-out is larger), the electric motor is not degraded (e.g., no diagnostic codes or MILs related to the electric motor are enabled), and the margin to surge is larger (e.g., a difference between the inlet pressure of the first compressor and a surge threshold is higher).

If any of the conditions for accelerating the second compressor are met, at 308, the method includes accelerating the second compressor while providing air to a piston engine via the first compressor. Herein, accelerating the second compressor includes not bypassing the second compressor while continuing to provide compressed air to the engine via the first compressor. The acceleration of the second compressor may be based on an inlet pressure of the first compressor relative to a surge threshold, the acceleration increased as the inlet pressure of the first compressor approaches or exceeds the surge threshold. The acceleration of the second compressor may be further based on a first flow of compressed air through the first compressor relative to a second flow of compressed air through the second compressor, the acceleration increased as a difference between the first and second flow increases. Details regarding calculation of the desired second compressor speed, or electric supercharger shaft speed, are elaborated below with reference to the algorithms provided at the description of at FIG. 4.

In addition to accelerating the second compressor, at 310, the method includes reducing an opening of the bypass valve coupled in the bypass across the second compressor to reduce the amount of air that is directed to the engine while bypassing the second compressor. In one example, the bypass valve is fully closed so that no air directed to the engine bypasses the second compressor.

At 311, it may be determined (e.g., via modeling) if accelerating the second compressor is sufficient to address (e.g., avoid) surge of the first compressor. If not, at 312, the method includes increasing the opening of the CRV (e.g., the CCRV) to increase recirculation of compressed air from downstream of the first compressor to upstream (e.g., to the compressor inlet) of the first compressor. The required CRV opening to address surge of the first compressor may be less than that required without the second compressor, thus providing potential for reduced size of the CRV.

If accelerating the second compressor is sufficient to address (e.g., avoid) surge of the first compressor, at 313, the net flow of pressurized air into the engine is reduced. As such, by accelerating the second compressor, an inlet pressure of the first compressor is increased, reducing the pressure ratio across the first compressor, and reducing the flow of air through the first compressor.

The second compressor may continue to be accelerated until the pressure ratio and mass flow rate of compressed air to the engine via the first compressor is below the surge threshold. Specifically, at 314, it may be determined if the margin to surge has improved. If not, at 318, acceleration of the second compressor may be maintained, and the CRV may remain open if applicable. Else, if the margin has improved, at 316, the second compressor may be decelerated (e.g., by disabling the electric motor) and the bypass valve opening may be increased. For example, the second compressor may be fully disabled while the bypass valve is fully opened. The routine then ends.

Thus, at 308-312, surge is addressed by accelerating the second compressor while minimizing the position of a compressor recirculation valve coupled across the first compressor. For example, the compressor recirculation valve may be maintained closed or partially open.

Returning to 306, conditions for accelerating the second compressor may be considered not met (that is, conditions for not accelerating the second compressor may be considered met) if any one of the following conditions are confirmed: the state of charge of the battery coupled to the electric motor of the second compressor is lower than a threshold, the engine torque demand reduction prompting the surge likelihood is lower than a threshold (e.g., the tip-out is smaller), the electric motor is degraded (e.g., a diagnostic codes or an MILs related to the electric motor is enabled), and the margin to surge is smaller (e.g., a difference between the inlet pressure of the first compressor and a surge threshold is lower).

If any of the conditions for not accelerating the second compressor are met, at 320, the method includes increasing the opening of the CRV to increase recirculation of compressed air from downstream of the first compressor to upstream (e.g., to the compressor inlet) of the first compressor. In one example, the CRV may be fully opened. At 322, the method includes maintaining the second compressor disabled. At 323, the method includes reducing the net flow of pressurized air into the engine. Thus, at 320-322, surge is addressed by increasing the opening of a compressor recirculation valve coupled across the first compressor while maintaining the speed of the second compressor. For example, the second compressor may be maintained disabled.

The CRV may be held more open until flow of compressed air to the engine via the first compressor is below the surge threshold. Specifically, at 324, as at 314, it may be determined if the margin to surge has improved. If not, the CRV may be maintained more open at 328. Else, if the margin has improved, at 326, the opening of the CRV may be decreased. For example, the CRV may be closed or returned to a default partially open position.

Thus, while the CRV addresses surge by increasing first compressor flow rate, the supercharger addresses surge by increasing the first compressor inlet pressure. While both approaches bring the compressor operation to the right of a surge line quickly, it may be possible to reduce the size of the CRV or eliminate the CRV completely by employing the supercharger.

In this way, a method for a boosted engine includes, in response to a first driver demand reduction, accelerating a second compressor while providing air to a piston engine via a first compressor; and in response to a second driver demand reduction, not accelerating the second compressor while providing air to the piston engine via the first compressor. The method further comprises, in response to the second driver demand reduction, increasing an opening of a recirculation valve to recirculate a portion of the pressurized air from an outlet to an inlet of the first compressor. Herein, the recirculation valve is a continuously variable valve, and increasing the opening of the recirculation valve includes actuating a solenoid of the valve. In other embodiments, an on/off CRV may be employed. The second compressor may be driven by a battery-operated electric motor, and during the first driver demand reduction, a state of charge of the battery is higher than a threshold, while during the second driver demand reduction, the state of charge of the battery is lower than the threshold. During the first driver demand reduction, a difference between inlet pressure of the first compressor and a surge threshold may be higher, and during the second driver demand reduction, the difference may be lower. Further, a drop in torque demand during the first driver demand reduction may be higher than a drop in torque demand during the second driver demand reduction. The second compressor may be driven by a battery-operated electric motor, and during the first driver demand reduction, the electric motor may not be degraded, while during the second driver demand reduction, the electric motor may be degraded. The second compressor may be a compressor of an electric supercharger, the first compressor may be a compressor of a turbocharger, and the second compressor may be positioned upstream of the first compressor along an intake passage.

Now turning to compressor map 400 of FIG. 4, the map depicts reduction of a pressure ratio across a turbocharger compressor without opening a compressor recirculation valve via adjustments to an electric supercharger. Map 400 shows compressor pressure ratio (along the y-axis) at different compressor flow rates (along the x-axis) for a turbocharger compressor, wherein the turbocharger compressor is staged downstream of an electric supercharger compressor. Line 402 (solid) shows a surge limit (herein, a hard surge limit) for the turbocharger compressor while line 412 (dashed) shows a surge limit for the supercharger compressor. Solid lines 420 (only 2 are labeled) depict the constant speed lines of the turbocharger compressor, while dashed lines 430 (only 2 are labeled) depict the constant speed lines of the supercharger compressor. Compressor operation to the left of hard surge limit results in turbocharger compressor operation in a hard surge region 404 (depicted as shaded region 704). Likewise, compressor operation to the left of hard surge limit 412 results in supercharger operation in a hard surge region (not demarcated). Compressor operation in hard surge region 404 results in objectionable NVH and potential degradation of engine performance.

Consider engine operation at point 406. A tip-out may occur while the engine is operating at point 406, moving engine operation to point 408. If no action is taken when the desired engine flow is reduced, a pressure ratio across the turbocharger compressor stays almost constant initially while mass flow trajectory on the turbocharger compressor moves from point 406 to point 408 (trajectory shown via dashed lines). Since the new location (point 408) is on the left side of surge line 402, the boosted engine system is likely to go into surge.

In comparison, if the electric supercharger were enabled during the tip-out, the inlet pressure of the main compressor can be increased. In the example shown, the pressure ratio across the main compressor is reduced. Consequently, the mass flow trajectory on the compressor map moves the engine operation point to a new location (point 410) which is on the right side of the surge line. As a result, the system does not go into surge.

To make sure that the second compressor of the electric supercharger and the first compressor of the turbocharger are both operated in the non-surge region, an algorithm, such as the algorithm described below, may be applied. The input to the first compressor of the electric supercharger (ES) may be designated $N_{ES\_des}$ (i.e., the desired supercharger speed or second compressor speed). By controlling the speed of the electric supercharger, a pressure at the outlet of the second compressor and inlet of the first turbocharger compressor (denoted herein as CIP) may be controlled as per equation (1):

$$CIP = f(N_{ES\_des}, W_{corr\_ES}, BP) \quad (1)$$

where BP denotes the second compressor inlet pressure and $W_{corr\_ES}$ denotes the corrected mass flow through the second compressor. An engine controller may choose $N_{ES\_des}$ so that CIP is controlled to make both compressors' operating points stay to the right of their respective surge lines. Each compressor's surge line is described using a function of pressure ratio and corrected mass flow rates. Criteria that indicate both compressors are operating in the non-surge region are shown as following:

$$\frac{TIP}{CIP} < SL_{turbo}(W_{corr\_turbo}) \text{ and } \frac{CIP}{BP} < SL_{ES}(W_{corr\_ES}) \quad (i)$$

where TIP is the first compressor outlet pressure. Note that the corrected flows, $W_{corr}$, are given by:

$$W_{corr\_ES} = W_{comp\_ES} * \frac{P_{ref}}{BP}\sqrt{\frac{ACT}{T_{ref}}} \text{ and}$$

$$W_{corr\_turbo} = W_{comp\_turbo} \frac{P_{ref}}{CIP}\sqrt{\frac{CIT}{T_{ref}}} \quad (ii)$$

where, $P_{ref}$ and $T_{ref}$ are pressure and temperature reference points provided by the supplier of the turbocharger and supercharger, and $W_{comp\_ES}$ and $W_{comp\_turbo}$ are the estimated or measured flows through the second compressor of the electric supercharger and the first compressor of the turbocharger, respectively. As such, the corrected mass flow of the first compressor depends on CIP. Therefore, using the equations (i) and (ii), a CIP may be determined to satisfy both inequalities if the following is satisfied:

$$\frac{TIP}{SL_{turbo}\left(W_{comp\_turbo} * \frac{P_{ref}}{CIP}\sqrt{\frac{CIT}{T_{ref}}}\right)} < \quad (iii)$$

$$CIP < BP * SL_{ES}\left(W_{comp\_ES} * \frac{P_{ref}}{BP}\sqrt{\frac{ACT}{T_{ref}}}\right)$$

If inequality (iii) has solution(s), then CIP can be controlled through operation of the second compressor using equation (1). Inequality (iii) has a non-linear relationship in CIP, which can be solved, for example, iteratively. Assume CIP* denotes the solution of the left hand inequality in (iii) with inequality substituted by equality. Therefore, substituting the inverse of equation (1) into (iii), the desired supercharger (second compressor) speed can be selected as follows:

$$f^{-1}(CIP^*, W_{comp\_ES}, BP) \leq N_{ES\_des} \leq f^{-1}(BP * SL_{ES}(W_{corr\_ES}), W_{comp\_ES}, BP) \quad (3)$$

Since minimum electric supercharger (second compressor) control effort is desired due to power consumption constraints and limited speed of response, the desired supercharger (second compressor) shaft speed may be determined as $N_{ES\_des} = f^{-1}(CIP^*, W_{comp\_ES}, BP)$, wherein TIP is throttle inlet pressure (at the outlet of the first compressor), ACT is the Air Charge Temperature, CIP is the first compressor inlet pressure (at the inlet of the first compressor), CIT is the inlet temperature of the first compressor, BP is the barometric pressure (at the inlet of the second compressor), W is the mass flow rate, and Corr is the corrected value.

Figure 5:
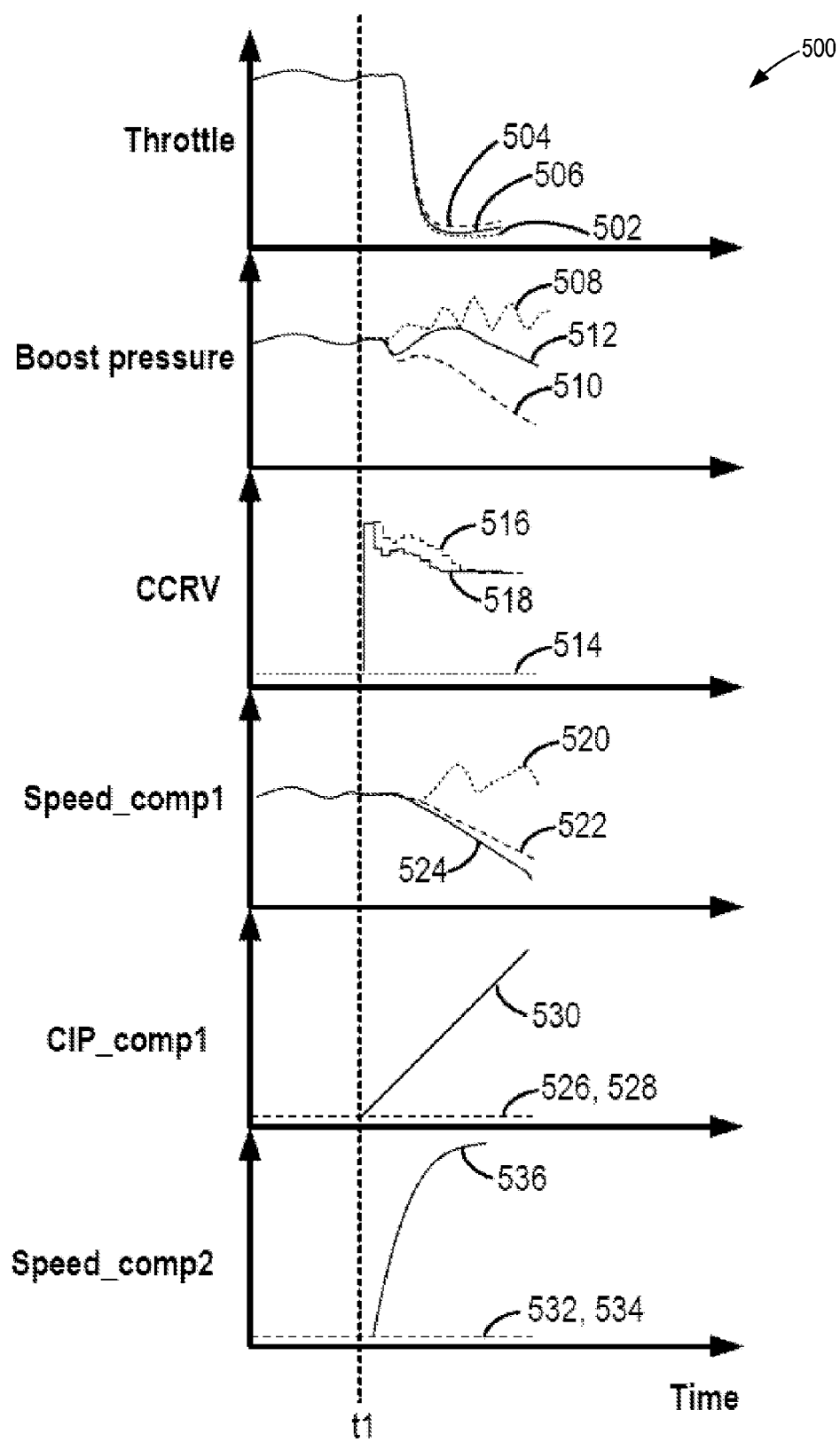
FIG. 5 shows example compressor adjustments that may be used to reduce surge during a tip-out.

Turning now to FIG. 5, an example map 500 is shown for improving a surge margin for a downstream turbocharger via operation of an upstream electric supercharger. Map 500 depicts intake throttle opening at plots 502-506, boost pressure at plots 508-512, the position of a CCRV at plots 514-518, the speed of a first downstream compressor of the turbocharger (speed_comp1) at plots 520-524, the inlet pressure of the first downstream compressor of the turbocharger (CIP_comp1) at plots 526-530, and the speed of a second upstream compressor of the supercharger (speed_comp2) at plots 532-536. In each set of plots for a given parameter, small dashed lines indicate parameter changes when surge is not addressed, large dashed lines indicate parameter settings as addressed in prior art, and solid lines indicate parameter settings according to the present disclosure. All plots are shown over time, along the x-axis. Note that elements aligning at a common time on the graph, such as at time t1, for example, are occurring concurrently, including for example where one parameter is increasing while another parameter is decreasing.

Prior to t1, the engine may be operating without the occurrence of surge. Prior to t1, torque demand and boost pressure may be provided via the first compressor only.

At t1, engine torque reduction may occur, for example, due to an operator pedal tip-out. In response to the tip-out, and the drop in torque demand, throttle opening may be decreased. If no action is taken, the first compressor may go into surge, as indicated at plot 508. A CCRV coupled across the first compressor is opened (plot 518) to address this surge To reduce the CCRV opening required to address surge, at t1, in response to the tip-out, the supercharger is enabled (plot 536) and the second compressor is accelerated. This results in an increase in inlet pressure at the first compressor (plot 530), improving the turbocharger's surge margin. As such, if the supercharger compressor were not enabled (plot 534), a larger CCRV opening (degree and/or duration of opening) may have been required to address the surge (as indicated at plot 516).

In one example, an engine system comprises: an engine having an intake; a first intake compressor driven by an exhaust turbine; a second intake compressor driven by an electric motor, the motor powered by a battery, the second compressor positioned upstream of the first compressor along the intake; a pressure sensor (or flow sensor) coupled to an inlet of the first compressor; and a controller with computer readable instructions stored on non-transitory memory for: operating the first compressor with the second compressor disabled to flow compressed air to the engine; and in response to a tip-out, while continuing to operate the first compressor, spinning the second compressor until a flow rate of compressed air through the first compressor is below a surge threshold. In the above embodiment, spinning the second compressor includes operating the electric motor at a speed based on a difference between the flow rate through the first compressor and the surge threshold, the speed increased as the difference decreases. In any of the above embodiments, the controller may include further instructions for, after the flow rate through the first compressor is decreased, disabling the second compressor and providing compressed air to the engine via the first compressor only.

Another example method for a boosted engine comprises bypassing a second compressor and providing a flow of compressed air to a piston engine via a first compressor; and in response to a decrease in demanded engine torque, accelerating the second compressor and reducing the flow of compressed air to the engine. In the preceding example, accelerating the second compressor additionally or optionally includes not bypassing the second compressor while continuing to provide compressed air via the first compressor. In any or all of the preceding examples, the second compressor is additionally or optionally staged upstream of the first compressor along an air intake passage. In any or all of the preceding examples, the second compressor is additionally or optionally driven by an electric motor and wherein the first compressor is driven by an exhaust turbine. In any or all of the preceding examples, the decrease in demanded engine torque is additionally or optionally responsive to one of an operator pedal tip-out, an engine transmission gearshift, a demand for traction control, and a demand for cruise control. In any or all of the preceding examples, the acceleration of the second compressor is additionally or optionally based on an inlet pressure of the first compressor relative to a surge threshold, the acceleration increased as the inlet pressure of the first compressor approaches or exceeds the surge threshold. In any or all of the preceding examples, the acceleration of the second compressor is additionally or optionally further based on a first flow of compressed air through the first compressor relative to a second flow of compressed air through the second compressor, the acceleration increased as a difference between the first and second flow increases. In any or all of the preceding examples, the accelerating additionally or optionally includes accelerating the second compressor until flow of compressed air to the engine via the first compressor is below a surge threshold, and then decelerating the second compressor. In any or all of the preceding examples, the method additionally or optionally further comprises, in response to an increase in demanded engine torque, accelerating the second compressor and increasing the flow of compressed air to the engine.

Another example method for a boosted engine comprises: in response to a first engine torque demand reduction, accelerating a second compressor while providing pressurized air to a piston engine via a first compressor; and in response to a second engine torque reduction, not accelerating the second compressor while providing pressurized air to the piston engine via the first compressor. The preceding example additionally or optionally further comprises in response to the second engine torque demand reduction, increasing an opening of a bypass valve to recirculate a portion of the pressurized air from an outlet to an inlet of the first compressor. In any or all of the preceding examples, the bypass valve is additionally or optionally a continuously variable valve, and increasing the opening of the bypass valve additionally or optionally includes actuating a solenoid of the valve. In any or all of the preceding examples, the second compressor is additionally or optionally driven by a battery-operated electric motor, and wherein during the first driver demand reduction, a state of charge of the battery is higher than a threshold, and wherein during the second driver demand reduction, the state of charge of the battery is lower than the threshold. In any or all of the preceding examples, additionally or optionally, during the first engine torque demand reduction, a difference between inlet pressure of the first compressor and a surge threshold is higher, and during the second engine torque demand reduction, the difference is lower. In any or all of the preceding examples, additionally or optionally, a drop in torque demand during the first engine torque demand reduction is higher than a drop in torque demand during the second engine torque demand reduction. In any or all of the preceding examples, additionally or optionally, the second compressor is driven by a battery-operated electric motor, and during the first engine torque demand reduction, the electric motor is not degraded, and during the second engine torque demand reduction, the electric motor is degraded. In any or all of the preceding examples, additionally or optionally, the second compressor is a compressor of an electric supercharger, the first compressor is a compressor of a turbocharger, and wherein the second compressor is positioned upstream of the first compressor along an intake passage.

In a further representation, a method for an engine comprises, in response to an indication of surge received while providing pressurized air to an engine via a first compressor, operating an electric motor coupled to a second compressor located upstream of the first compressor and increasing recirculation of pressurized air across the first compressor. In the preceding example, the first compressor is additionally or optionally a compressor of a turbocharger and the second compressor is additionally or optionally a compressor of a supercharger. In any or all of the preceding examples, operating the electric motor additionally or optionally includes adjusting a speed of the electric motor based on the indication of surge, and increasing recirculation of pressurized air across the first compressor additionally or optionally includes increasing an opening of a compressor recirculation valve coupled in a bypass across the first compressor. In any or all of the preceding examples, additionally or optionally, the indication of surge includes an indication of surge at the first compressor, and the compressor recirculation valve is a continuously variable compressor recirculation valve. In any or all of the preceding examples, the increasing recirculation via the compressor recirculation valve is additionally or optionally based on the acceleration of the second compressor, the compressor recirculation valve opened to a smaller degree when a rotation speed of the electric motor driving the second compressor is higher.

In this way, an electric supercharger may be used to reduce the likelihood of tip-out induced surge at a downstream turbocharger, such as in aggressively downsized engines. By using the supercharger to raise turbocharger compressor inlet pressure during surge conditions, a compressor recirculation valve may be reduced in size or eliminated.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
bypassing a second compressor by adjusting a bypass valve with a controller and providing a flow of compressed air to a piston engine via a first compressor; and
via the controller communicating with an actuator coupled with the engine, in response to a decrease in demanded engine torque, accelerating the second compressor and reducing the flow of compressed air to the piston engine.

2. The method of claim 1, wherein accelerating the second compressor includes accelerating the second compressor and not bypassing the second compressor while continuing to provide compressed air via the first compressor until the flow of compressed air to the piston engine via the first compressor is below a surge threshold, and then decelerating the second compressor.

3. The method of claim 1, wherein the second compressor is staged upstream of the first compressor along an air intake passage and is driven by an electric motor and wherein the first compressor is driven by an exhaust turbine.

4. The method of claim 3, further comprising, while accelerating the second compressor, increasing recirculation of compressed air from downstream of the first compressor to an inlet of the first compressor via a compressor recirculation valve.

5. The method of claim 4, wherein the compressor recirculation valve is a continuously variable compressor recirculation valve, and wherein the increasing recirculation via the compressor recirculation valve is based on the acceleration of the second compressor, the compressor recirculation valve opened to a smaller degree when a rotation speed of the electric motor driving the second compressor is higher.

6. The method of claim 1, wherein the decrease in demanded engine torque is responsive to one of an operator pedal tip-out, an engine transmission gearshift, a demand for traction control, and a demand for cruise control.

7. The method of claim 1, wherein the acceleration of the second compressor is based on an inlet pressure of the first compressor relative to a surge threshold, the acceleration increased as the inlet pressure of the first compressor approaches or exceeds the surge threshold.

8. The method of claim 1, wherein the acceleration of the second compressor is further based on a first flow of compressed air through the first compressor relative to a second flow of compressed air through the second compressor, the acceleration increased as a difference between the first and second flows increases.

9. The method of claim 1, further comprising, in response to an increase in demanded engine torque, accelerating the second compressor and increasing the flow of compressed air to the piston engine.

10. A method for a boosted engine, comprising:
in response to a first engine torque demand reduction, via a controller communicating with engine actuators, accelerating a second compressor while providing pressurized air to a piston engine via a first compressor; and
in response to a second engine torque demand reduction, via the controller communicating with engine actuators, not accelerating the second compressor while providing pressurized air to the piston engine via the first compressor.

11. The method of claim 10, further comprising, in response to the second engine torque demand reduction, increasing an opening of a recirculation valve to recirculate a portion of the pressurized air from an outlet to an inlet of the first compressor.

12. The method of claim 11, wherein the recirculation valve is a continuously variable valve, and wherein increasing the opening of the recirculation valve includes actuating a solenoid of the recirculation valve.

13. The method of claim 10, wherein the second compressor is driven by a battery-operated electric motor, and wherein during the first engine torque demand reduction, a state of charge of a battery is higher than a threshold, and wherein during the second engine torque demand reduction, the state of charge of the battery is lower than the threshold.

14. The method of claim 10, wherein during the first engine torque demand reduction, a difference between inlet pressure of the first compressor and a surge threshold is higher, and wherein during the second engine torque demand reduction, the difference is lower.

15. The method of claim 10, wherein a drop in torque demand during the first engine torque demand reduction is higher than a drop in torque demand during the second engine torque demand reduction.

16. The method of claim 10, wherein the second compressor is driven by a battery-operated electric motor, and wherein during the first engine torque demand reduction, the electric motor is not degraded, and wherein during the second engine torque demand reduction, the electric motor is degraded.

17. The method of claim 10, wherein the second compressor is a compressor of an electric supercharger, the first compressor is a compressor of a turbocharger, and wherein the second compressor is positioned upstream of the first compressor along an intake passage.

18. An engine system, comprising:
    an engine having an intake;
    a first intake compressor driven by an exhaust turbine;
    a second intake compressor driven by an electric motor, the electric motor powered by a battery, the second compressor positioned upstream of the first compressor along the intake;
    a pressure sensor coupled to an inlet of the first compressor; and
    a controller with computer readable instructions stored on non-transitory memory for:
        operating the first compressor with the second compressor disabled to flow compressed air to the engine; and
        in response to an engine torque reduction, while continuing to operate the first compressor, spinning the second compressor until a flow rate of compressed air through the first compressor is below a surge threshold.

19. The system of claim 18, wherein spinning the second compressor includes operating the electric motor at a speed based on a difference between the flow rate through the first compressor and the surge threshold, the speed increased as the difference decreases.

20. The system of claim 19, wherein the controller includes further instructions for, after the flow rate through the first compressor is decreased, disabling the second compressor and providing compressed air to the engine via the first compressor only.

\* \* \* \* \*